(12) United States Patent
Lissianski et al.

(10) Patent No.: US 7,504,081 B2
(45) Date of Patent: Mar. 17, 2009

(54) METHODS AND APPARATUS TO FACILITATE REDUCING MERCURY EMISSIONS

(75) Inventors: Vitali Victor Lissianski, San Juan Capistrano, CA (US); Peter Martin Maly, Lake Forest, CA (US); William Randall Seeker, San Clemente, CA (US)

(73) Assignee: General Electric Company, Schenectady, NY (US)

( * ) Notice: Subject to any disclaimer, the term of this patent is extended or adjusted under 35 U.S.C. 154(b) by 239 days.

(21) Appl. No.: 11/691,996

(22) Filed: Mar. 27, 2007

(65) Prior Publication Data

US 2008/0241028 A1   Oct. 2, 2008

(51) Int. Cl.
*B01D 53/64* (2006.01)
*B01D 53/81* (2006.01)
*F23B 80/00* (2006.01)
*F23B 90/00* (2006.01)
*F23B 99/00* (2006.01)
*F23J 15/00* (2006.01)

(52) U.S. Cl. .................. 423/210; 422/168; 110/203; 110/216; 110/233; 110/345

(58) Field of Classification Search .................. 423/210; 422/168; 110/203, 216, 233, 345
See application file for complete search history.

(56) References Cited

U.S. PATENT DOCUMENTS

| | | | |
|---|---|---|---|
| 4,273,747 A | 6/1981 | Rasmussen | |
| 5,507,238 A | 4/1996 | Knowles | |
| 6,027,551 A | 2/2000 | Hwang et al. | |
| 6,168,709 B1 | 1/2001 | Etter | |
| 6,206,685 B1 | 3/2001 | Zamansky et al. | |
| 6,280,695 B1 | 8/2001 | Lissianski et al. | |
| 6,451,094 B1 | 9/2002 | Chang et al. | |
| 6,471,506 B1 | 10/2002 | Zamansky et al. | |
| 6,595,147 B2 | 7/2003 | Teller et al. | |
| 6,604,474 B2 | 8/2003 | Zamansky et al. | |
| 6,694,900 B2 | 2/2004 | Lissianski et al. | |
| 6,726,888 B2 | 4/2004 | Lanier et al. | |
| 6,863,005 B2 | 3/2005 | Lanier et al. | |
| 6,895,875 B1 | 5/2005 | Lissianski et al. | |
| 6,981,456 B2 | 1/2006 | Lissianski et al. | |
| 7,452,517 B2 * | 11/2008 | Lissianski et al. ........... 423/210 |
| 2003/0143128 A1 | 7/2003 | Lanier et al. | |
| 2005/0036926 A1 | 2/2005 | Lissianski et al. | |
| 2005/0106516 A1 | 5/2005 | Payne et al. | |
| 2005/0129600 A1 | 6/2005 | Lanier et al. | |
| 2005/0130828 A1 * | 6/2005 | Ohono et al. ................. 501/80 |
| 2005/0147549 A1 | 7/2005 | Lissianski et al. | |

(Continued)

FOREIGN PATENT DOCUMENTS

EP    1040865 A2    10/1999

(Continued)

*Primary Examiner*—Timothy C Vanoy
(74) *Attorney, Agent, or Firm*—Armstrong Teasdale LLP

(57) ABSTRACT

A method for reducing an amount of mercury in flue gas is provided. The method includes injecting a quantity of coal having a fineness of less than 70%<200 mesh and greater than or equal to 50%<200 mesh. The quantity of coal is combusted in a quantity of air such that at least carbon-containing fly ash and mercury are formed. Mercury is oxidized using at least the carbon-contain fly ash.

20 Claims, 3 Drawing Sheets

U.S. PATENT DOCUMENTS

| | | |
|---|---|---|
| 2005/0274307 A1 | 12/2005 | Lissianski et al. |
| 2006/0021554 A1 | 2/2006 | Lissianski et al. |
| 2006/0029531 A1* | 2/2006 | Breen et al. ................. 423/210 |
| 2006/0120934 A1 | 6/2006 | Lanier et al. |
| 2007/0116616 A1 | 5/2007 | Taylor |
| 2007/0128096 A1* | 6/2007 | Lissianski et al. ........ 423/213.2 |
| 2008/0011158 A1 | 1/2008 | Barger et al. |

FOREIGN PATENT DOCUMENTS

| | | |
|---|---|---|
| JP | 56127102 A | 10/1981 |

* cited by examiner

METHODS AND APPARATUS TO FACILITATE REDUCING MERCURY EMISSIONS

BACKGROUND OF THE INVENTION

This invention relates generally to combustion devices and, more particularly, to emission control systems for combustion devices.

During a typical combustion process within a furnace or boiler, for example, a flow of combustion gas, or flue gas, is produced. Known combustion gases contain combustion products including, but not limited to, carbon, fly ash, carbon dioxide, carbon monoxide, water, hydrogen, nitrogen, sulfur, chlorine, and/or mercury generated as a result of combusting solid and/or liquid fuels.

The volabum tile metal mercury, Hg, is an air pollutant produced through coal combustion. Mercury released from coal during combustion is readily aerosolized and can become airborne. Airborne mercury may travel globally prior to being deposited into soil and water. Mercury deposited in the environment is a persistent and toxic pollutant that may accumulate in the food chain. For example, mercury can be transformed within microorganisms into methylmercury, and consumption of contaminated fish may be a major route of human exposure to methylmercury. Methylmercury may be toxic to humans and may be associated with disorders of the nervous system, comas, heart disease, and death. Moreover, the adverse affects of methylmercury may be more severe to children and women of childbearing age.

Mercury emissions from coal-fired power plants are the subject of governmental regulation. The control of mercury emissions is complicated by the several forms mercury may take within combustion flue gas. For example, at combustion temperatures, mercury is present in flue gas in its elemental form, $Hg^0$, which may be difficult to control because elemental mercury is easily volatized and unreactive. Mercury reacts with carbon as flue gas cools below 1000° F., and such reactions may convert mercury to its highly reactive, oxidized form, $Hg^{+2}$. Mercury may also be absorbed in fly ash and/or other flue gas particles to form particulate bound mercury, Hgp.

Since mercury can take several forms, known control technologies do not effectively control mercury emission for all coal types and for all combustion furnace configurations. Some known mercury control technologies take advantage of mercury's reactivity with carbon and use carbon as a mercury sorbent to form oxidized mercury. Carbon may be injected into mercury-containing flue gas in the form of activated carbon or may be formed in-situ during the combustion process as a result of incomplete coal combustion. Further, carbon in the presence of chlorine, Cl, may increase the oxidation of elemental mercury. In flue gas, mercury can be converted to its oxidized form, $Hg^{+2}$, and react with chlorine-containing species to form mercuric chloride, $HgCl_2$. As such, the extent of mercury oxidation in flue gas is generally higher for coals with a higher chlorine content, such as bituminous coals, and lower for coals with a lower chlorine content, such as low-rank coals.

Efficiencies of most available mercury emission control technologies depend on the mercury speciation in flue gas. Oxidized mercury is water-soluble and may be removed from flue gas using known wet desulfurization systems (wet-scrubbers). At least some particulate bound mercury may be removed from flue gas using known particulate collection systems. Elemental mercury is more difficult to remove than oxidized mercury and/or particulate bound mercury because elemental mercury is unreactive and, as such, cannot be removed from flue gas with wet desulfurization systems or particulate collection system.

One known mercury control technology injects a sorbent, usually activated carbon, into the flow of flue gas to react with mercury therein. Because carbon is more reactive towards mercury at temperatures below 350° F., activated carbon is typically injected upstream from a particulate collection device, such as an electrostatic precipitator or a baghouse. Oxidized mercury is the most easily removable species of mercury and may be formed by injecting sorbent. As a result, the higher the fraction of oxidized mercury in flue gas, the higher the efficiency of mercury removal. Depending on the sorbent injection configuration and coal type, the efficiency of mercury removal typically ranges from 40% to 90% removal of mercury emissions. However, the cost of using activated carbon for mercury control may be expensive, and as such, mercury emission control may be affected by the cost associated with the removal.

Mercury may also be removed from flue gas by reacting with carbon in high-carbon fly ash formed in-situ in the combustion process. High-carbon fly ash is formed during the combustion of bituminous coals in coal reburning and air staging, and may be an effective mercury sorbent. Other coals, such as, for example, Powder River Basin (PRB) and lignite coals, are considered low-rank coals, and as such, represent a significant portion of the coal energy market. Such coals often have a low sulfur content that solves the problem of sulfur dioxide emissions, but may also have a low chlorine content. As such, the mercury in low-rank coals may not be oxidized because of a lack of chlorine and the presence of other constituents that tend to suppress mercury oxidation. As a result, mercury released during combustion is primarily elemental mercury. Moreover, because of the high reactivity of low-rank coals, fly ash from the combustion of such coals usually has a low carbon content. Coal reburning and air staging, which typically increases the carbon content in fly ash for bituminous coals, usually do not significantly increase the carbon-in-fly ash content for low-rank coals. As such, mercury removal through reactions with carbon-in-fly ash may not be effective because such fly ash does not have a sufficient amount of carbon with which the mercury can react.

BRIEF DESCRIPTION OF THE INVENTION

In one aspect a method for reducing an amount of mercury in flue gas is provided. The method includes injecting a quantity of coal having a fineness of less than 70%<200 mesh and greater than or equal to 50%<200 mesh. The quantity of coal is combusted in a quantity of air such that at least carbon-containing fly ash and mercury are formed. Mercury is oxidized using at least the carbon-contain fly ash.

In another aspect a method for operating a coal-fired power plant is provided. The method includes injecting coal into a combustion zone, wherein less than 70% and greater than or equal to 50% of coal particles have a diameter of less than 0.0029 inches and combusting coal in a quantity of air such that the coal combusts to form at least a combustion gas including at least mercury and carbon-containing fly ash. Mercury is oxidized using at least carbon-contain fly ash to facilitate removing mercury from the combustion gas.

In a still further aspect a coal-fired power plant is provided. The coal-fired power plant including a combustion zone and coal having a fineness of less than 70%<200 mesh and greater than or equal to 50%<200 mesh. Combustion gas is formed by combusting the coal within the combustion zone. The combustion gas includes at least carbon-containing fly ash and mercury. The power plant further includes a duct wherein mercury reacts with at least the carbon-containing fly ash.

DETAILED DESCRIPTION OF THE INVENTION

Figure 1:
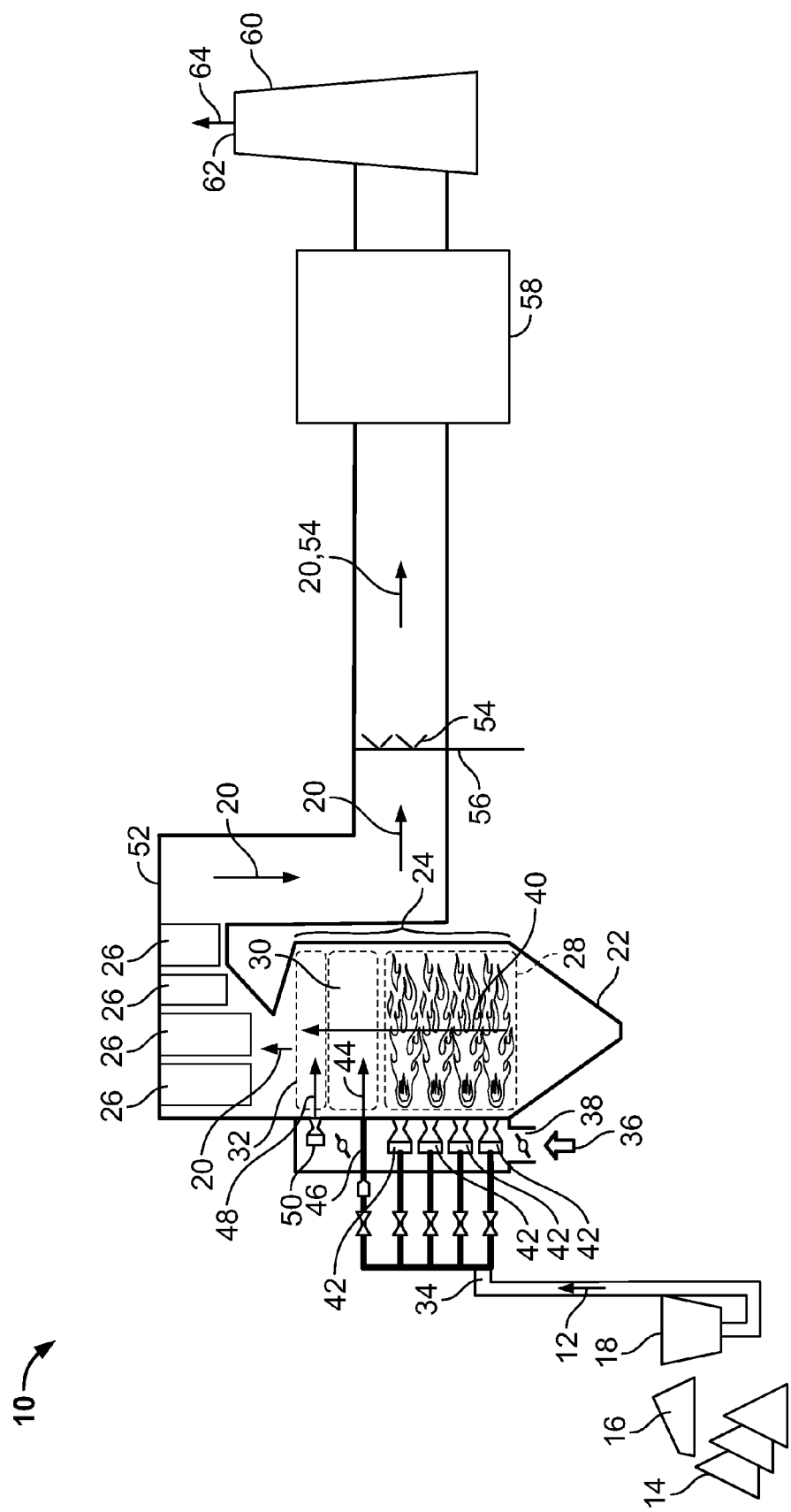
FIG. 1 is a schematic view of an exemplary power plant system.

FIG. 1 is a schematic view of an exemplary power plant system 10. In the exemplary embodiment, system 10 is supplied with fuel 12 in the form of coal 14. More specifically, in the exemplary embodiment, the coal 14 is bituminous coal, such as, but not limited to, Powder River Basin (PRB) coal, lignite coal, and/or any other suitable coal that enables system 10 to function as described herein. Alternatively, fuel 12 may be any other suitable fuel, such as, but not limited to, oil, natural gas, biomass, waste, or any other fossil or renewable fuel. In the exemplary embodiment, coal 14 is supplied to system 10 from a coal supply 16 is processed in a coal mill 18. In the exemplary embodiment, coal 14 is pulverized in coal mill 18 to form coal particles (not shown) having a predetermined and selectable fineness.

In the exemplary embodiment, coal fineness is measured using a known sieve analysis method, including, but not limited to, U.S. or Tyler sieves. Alternatively, coal fineness may be measured using any other suitable method. In sieve analysis, a series of wire mesh screens (not shown) are arranged in a column (not shown) based on ascending openings per inch, for example, a wire mesh screen with 200 openings per inch is referred to as 200 mesh. Exemplary wire mesh screen opening sizes based on openings per inch are listed in Table 1. Alternatively, openings may have sizes that are any other suitable size for the type of mesh used to measure fineness.

TABLE 1

| Mesh size (openings/inch) | Opening size | |
|---|---|---|
| | inches | millimeters |
| 4 | 0.187 | 4.75 |
| 10 | 0.066 | 1.70 |
| 20 | 0.0334 | 0.850 |
| 32 | 0.0196 | 0.500 |
| 48 | 0.0118 | 0.300 |
| 60 | 0.0098 | 0.250 |
| 80 | 0.0070 | 0.180 |
| 100 | 0.0059 | 0.150 |
| 170 | 0.0035 | 0.090 |
| 200 | 0.0029 | 0.075 |

In the exemplary embodiment, a coal particle (not shown) passing through a 200 mesh screen has a diameter (not shown) less than approximately 0.0029" or 0.075 mm. Further, in the exemplary embodiment, coal fineness is measured by the percentage of coal particles passing through a wire mesh screen. A fineness of coal measurement may be, for example, but not limited to being, 70%<200 mesh, which denotes that 70 percent of the coal particles pass through a mesh screen having 200 openings per inch. As such, coal fineness is measured as an average coal particle size. Alternatively, coal fineness may be quantized using any other suitable method and/or measurement system.

In the exemplary embodiment, coal 14 supplied from coal mill 18 to system 10 has a fineness of less than 70%<200 mesh and greater than or equal to 50%<200 mesh. Alternatively, coal 14 supplied to system 10 has a fineness of less than 70%<200 mesh and greater than or equal to 1%<50 mesh. Alternatively, coal 14 has a fineness that is suitable for reacting with mercury and other pollutants in flue gas 20, as described herein, such that the pollutants are substantially removed from flue gas 20.

In the exemplary embodiment, fuel 12, such as, for example, coal 14 from coal mill 18, is supplied to a boiler or a furnace 22. More specifically, in the exemplary embodiment, system 10 includes a coal-fired furnace 22 that includes a combustion zone 24 and heat exchangers 26. Combustion zone 24 includes a primary combustion zone 28, a reburning zone 30, and a burnout zone 32. Alternatively, combustion zone 24 may not include reburning zone 30 and/or burnout zone 32 such that furnace 22 is a "straight fire" furnace (not shown). Fuel 12 enters system 10 through a fuel inlet 34, and air 36 enters system 10 through an air inlet 38. Primary combustion zone 28 ignites the fuel/air mixture to create combustion gas 40.

In the exemplary embodiment, fuel 12 and air 36 are supplied to primary combustion zone 28 through one or more main injectors and/or burners 42. Main burners 42 receive a predetermined amount of fuel 12 from fuel inlet 34 and a predetermined quantity of air 36 from air inlet 38. Burners 42 may be tangentially arranged in each corner of furnace 22, wall-fired, or have any other suitable arrangement that enables furnace 22 to function as described herein. Within primary combustion zone 28, combustion gas 40 is formed, and may include, but is not limited to including, carbon, carbon containing fly ash, carbon dioxide, carbon monoxide, water, hydrogen, nitrogen, sulfur, chlorine, and/or mercury. Fuel products not contained in combustion gas 40 may be solids and may be discharged from furnace 22 as waste (not shown).

In the exemplary embodiment, combustion gases 40 flow from primary combustion zone 28 towards reburning zone 30. In reburning zone 30, a predetermined amount of reburn fuel 44 is injected through a reburn fuel inlet 46. Reburn fuel 44 is supplied to inlet 46 from fuel inlet 34. Although reburn fuel 44 and fuel 12 are shown as originating at a common source, such as fuel inlet 34, reburn fuel 44 may be supplied from a source other than fuel inlet 34, and/or may be a different type of fuel than fuel 12. For example, fuel 12 entering through fuel inlet 34 may be, but is not limited to being, pulverized coal, and reburn fuel 44 entering through a separate reburn fuel inlet (not shown) may be natural gas. In the exemplary embodiment, the amount of reburn fuel 44 injected is based on a desired stoichiometric ratio within reburning zone 30, as described herein. More specifically, in the exemplary embodiment, the amount of reburn fuel 44 is selected to create a fuel-rich environment in reburning zone 30. As such, less of the carbon in fuel 12 is combusted, which facilitates increasing the Loss on Ignition (LOI) and facilitates creating a more reactive, high-carbon content fly ash entrained in combustion gases 40.

In the exemplary embodiment, combustion gases 40 flow from reburning zone 30 into burnout zone 32. Overfire air 48 is injected into burnout zone 32 through an inlet 50, and a predetermined quantity of overfire air 48 is injected into burnout zone 32. In the exemplary embodiment, overfire air inlet 50 is in flow communication with air inlet 38. Alternatively, overfire air 48 may be supplied to system 10 through inlet 50 that is separate from air inlet 38. The quantity of overfire air 48 is selected based on a desired stoichiometric ratio within burnout zone 32, as described herein. More specifically, in the exemplary embodiment, the quantity of overfire air 48 is selected to facilitate completing the combustion of fuel 12 and reburn fuel 44, which facilitates reducing pollutants in combustion gas 40, such as, but not limited to, nitrogen oxides, $NO_x$, and/or carbon monoxide, CO.

In the exemplary embodiment, flue gas 20 exits combustion zone 24 and may include, but is not limited to including, carbon, carbon containing fly ash, carbon dioxide, carbon monoxide, water, hydrogen, nitrogen, sulfur, chlorine, and/or mercury. Flue gas 20 exits combustion zone 24 and enters heat exchangers 26. Heat exchangers 26 transfer heat from flue gas 20 to a fluid (not shown). More specifically, the heat transfer heats the fluid, such as, for example, heating water to generate steam. The heated fluid, for example, the steam, is used to generate power, typically by known power generation methods and systems (not shown), such as, for example, a steam turbine (not shown). Alternatively, heat exchangers 26 transfer heat from flue gas 20 to a fuel cell (not shown) used to generate power. Power may be supplied to a power grid (not shown) or any suitable power outlet.

In the exemplary embodiment, flue gas 20 flows from heat exchangers 26 to a duct or convective pass 52. As flue gas 20 flows through convective pass 52, flue gas 20 is cooled to a temperature that is less than the combustion temperature. More specifically, in the exemplary embodiment, flue gas 20 within pass 52 is cooled convectively, conductively, and/or radiantly by ambient air (not shown) and/or any other suitable cooling fluid (not shown). In the exemplary embodiment, the cooling fluid at least partially surrounds pass 52 to facilitate cooling flue gases 20 therein. In an alternative embodiment, the cooling fluid is vented into pass 52 to facilitate cooling flue gases 20. In another alternative embodiment, system 10 includes cooling fluid at least partially surrounding pass 52 and cooling fluid vented into pass 52 to facilitate cooling flue gases 20. In the exemplary embodiment, flue gas 20 is cooled to a temperature that enables mercury to react with the carbon in the fly ash, for example, but not limited to, a temperature below 350° F. As such, mercury is oxidized by, and captured by, carbon, chlorine, and/or any other suitable mercury-reactive elements and/or compounds in flue gas 20.

In the exemplary embodiment, a predetermined amount of sorbent 54 is injected into convective pass 52 to react with flue gas 20. In the exemplary embodiment, sorbent 54 is injected into pass 52 through a sorbent injector 56. Alternatively, sorbent 54 is not injected to convective pass 52, but rather mercury entrained in flue gas 20 reacts only with elements and/or compounds present within flue gas 20. The sorbent 54 injected is selected to facilitate oxidation of mercury. For example, in the exemplary embodiment, sorbent 54 is activated carbon. Alternatively, sorbent 54 may be any other suitable element and/or compound that facilitates oxidation of mercury.

In the exemplary embodiment, flue gas 20 and sorbent 54 flow through convective pass 52 to a particulate control device 58. More specifically, in the exemplary embodiment, particulate control device 58 may be, for example, but is not limited to being, an electrostatic precipitator (not shown) or a baghouse (not shown), used to collect ash containing oxidized mercury and/or particulate bound mercury. In an alternative embodiment, system 10 may include an ash burnout unit (not shown) and/or a mercury collection unit (not shown) coupled to particulate control device 58. The ash burnout unit facilitates the removal of carbon from flue gas 20, which desorbs mercury from the fly ash. The mercury collection unit is coupled to the ash burnout unit and may include activated carbon, or any other suitable reagent, for capturing mercury desorbed by the burnout unit. System 10 may further include a wet scrubber (not shown) and/or a dry scrubber (not shown) positioned downstream of particulate control device 58 for removing oxidized mercury and/or particulate bound mercury from flue gas 20 and/or other compounds and/or elements from flue gas 20, such as, for example, sulfur dioxide. System 10 includes an exhaust stack 60 that has an opening 62 through which exhaust gases 64 exit system 10.

During operation, coal particles with a fineness of less than 70%<200 mesh and greater than or equal to 50%<200 mesh are supplied to furnace 22. Alternatively, coal particles with a fineness of less than 70%<200 mesh and greater than or equal to 1%<50 mesh are supplied to furnace 22. In furnace 22, coal particles are partially combusted such that the fly ash entrained in combustion gases 40 has a higher carbon content in comparison with furnaces that combust finer coal particles. Generally, coal particles with a higher fineness, such as, for example, a fineness of 76%<200 mesh, combust more fully and decrease the LOI of system 10. In the exemplary embodiment, coal particles with a fineness of less than 70%<200 mesh and greater than or equal to 50%<200 mesh combust to form high-carbon fly ash, which is more reactive with mercury in flue gas 20.

Flue gas 20 flows from combustion zone 24 through heat exchangers 26 and into convective pass 52. As flue gases 20 cool within convective pass 52, mercury reacts with the carbon entrained within flue gas 20 to form oxidized mercury. Mercury may also react with elements and/or compounds within flue gas 20 to form particulate bound mercury. In the exemplary embodiment, sorbent 54 is injected into pass 52 to facilitate mercury entrained within flue gas 20 to react with sorbent 54 to form oxidized and/or particulate bound mercury. More specifically, in the exemplary embodiment, sorbent 54 is injected into pass 52 such that flue gas 20 is cooled to a temperature below the combustion temperature, such as, for example, to a temperature below 350° F. In the exemplary embodiment, coal particles with a fineness of less than 70%<200 mesh and greater than or equal to 50%<200 mesh facilitate reducing mercury in flue gas 20 because mercury reacts with the increased amount of carbon in flue gas 20 as the gases 20 are cooled within convective pass 52. Oxidized and/or particulate bound mercury is removed from flue gas 20 by particulate control device 58, the wet scrubber, and/or the mercury collection unit. At least partially decontaminated flue gases 20 exit system 10 as exhaust gases 64 discharged through exhaust stack 60.

Tests were performed using a 1.0 MMBTU/hr Boiler Simulator Facility (BSF) (not shown) to determine the effect of coal fineness and air staging on mercury oxidation and removal. The following test results and the BSF in which the tests were conducted are exemplary only and are in no way limiting. The BSF is designed to provide an accurate sub-scale simulation of flue gas temperatures and compositions found in system 10. The BSF includes a burner (not shown), a vertically down-fired radiant furnace (not shown), a horizontal convective pass (not shown) extending from the furnace, and a baghouse (not shown) coupled in flow communication with the convective pass. The burner is a variable swirl diffusion burner with an axial fuel injector (not shown), and is used to simulate the approximate temperature and gas composition of a commercial burner in a full-scale boiler, such as, for example, system 10. Primary air (not shown) is injected axially, while a secondary air stream (not shown) is injected radially through swirl vanes (not shown) to provide controlled fuel/air mixing. The swirl number can be controlled by adjusting the orientation of the swirl vanes. Numerous access ports (not shown) located along the axis of the facility allow access for supplementary equipment such as reburn injectors (not shown), additive injectors (not shown), overfire air injectors (not shown), and sampling probes (not shown). The radiant furnace is constructed of eight modular refractory lined sections (not shown) with an inside diameter (not shown) of 22 inches and a total height (not shown) of 20 feet.

The convective pass of the BSF is also refractory lined, and contains air cooled tube bundles (not shown) that simulate the superheater and reheater sections of a full-scale boiler, such as, for example, system 10. Heat extraction in the radiant furnace and the convective pass are controlled such that the residence time-temperature profile substantially matches that of a typical full-scale boiler, such as, for example, system 10. A suction pyrometer (not shown) is used to measure furnace gas temperatures. The particulate control device (not shown) for the BSF is a three-field electrostatic precipitator (ESP). Mercury concentration was measured at an ESP inlet (not shown) and an ESP outlet (not shown) using a continuous emissions monitoring system (not shown) that is capable of measuring both elemental mercury and total mercury. The concentration of oxidized mercury is determined using the difference between total mercury and elemental mercury concentrations.

Exemplary tests were conducted with and without air staging in the BSF. The stoichiometric ratio (SR) in the furnace is defined as the ratio of the actual oxygen, $O_2$, to actual fuel concentration in the furnace, or the actual air-fuel ratio, over the oxygen to fuel concentration that results in the complete consumption of oxygen and fuel, or the air-fuel ratio at stoichiometric conditions. More specifically, SR is defined by equation 1.

$$SR = \frac{AFR_A}{AFR_S}, \quad \text{(equation 1)}$$

where $$AFR_A = O_A/F_A, \quad \text{(equation 2)}$$

$$AFR_S = O_S/F_S, \quad \text{(equation 3)}$$

where, SR is the stoichiometric ratio;
$AFR_A$ is the actual air-fuel ratio, or the actual concentration of air to fuel in the furnace;
$AFR_S$ is the stoichiometric air-fuel ratio, or the oxygen to fuel concentration that results in the complete consumption of oxygen and fuel;
$O_A$ is the mass of the actual oxygen present in the furnace;
$F_A$ is the mass of the actual fuel present in the furnace;
$O_S$ is the mass of the oxygen present for complete combustion of fuel present in the furnace, or the mass of oxygen present at stoichiometric conditions; and
$F_S$ is the mass of the fuel present for complete combustion of oxygen present in the furnace, or the mass of fuel present at stoichiometric conditions.

In baseline tests without air staging ("straight firing"), the stoichiometric ratio (SR) in the combustion zone of the furnace was approximately equal to 1.16, which corresponds to about 3% excess air, or an exemplary fuel-lean environment. Straight firing is considered the "Baseline" illustrating the exemplary effects of an excess-air environment in FIGS. 2-5. In testing with exemplary air staging, SR was set equal to approximately 1.0 and approximately 0.7, which are an exemplary ideal stoichiometric environment and an exemplary fuel-rich environment, respectively. Low-rank coals with exemplary finenesses of 76% and 68% of particles passing through 200 mesh were tested at each exemplary stoichiometric ratio 1.16, 1.0, and 0.7 and over a range of exemplary ESP inlet and ESP outlet temperatures. In FIGS. 2-5, exemplary test result data for SR=1.16 (baseline) is represented by squares, exemplary test result data for SR=1.0 is represented by shaded triangles, and exemplary test result data for SR=0.7 is represented by shaded squares.

Figure 2:
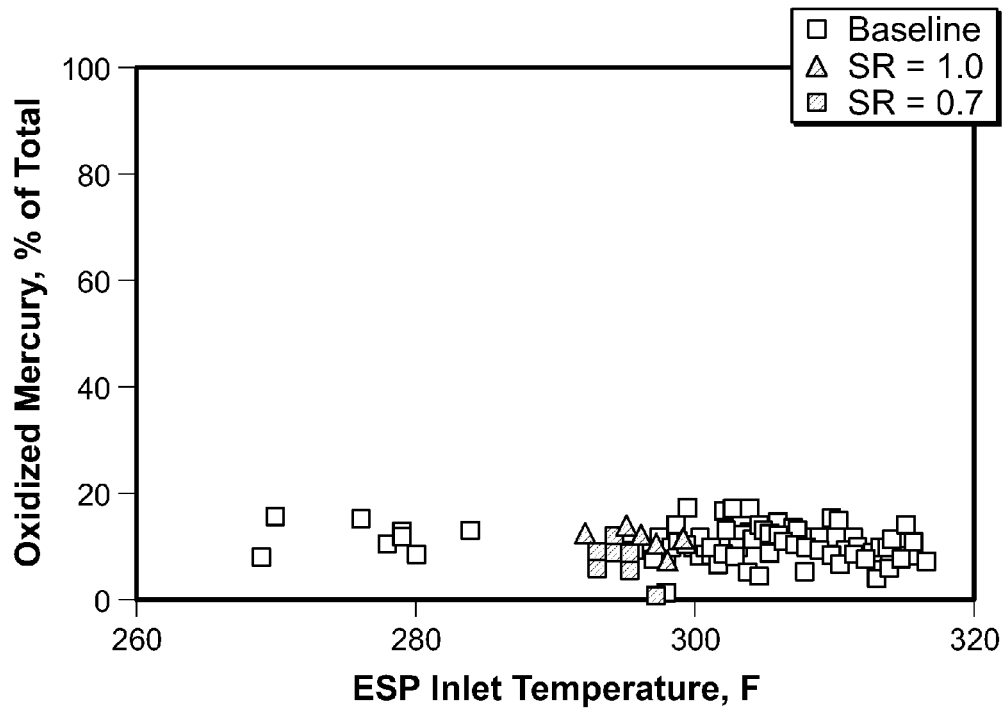
FIG. 2 is a graphical representation illustrating exemplary effects of air staging and temperature on mercury oxidation at an electrostatic precipitator (ESP) inlet and at a coal fineness of 76%<200 mesh.
Figure 3:
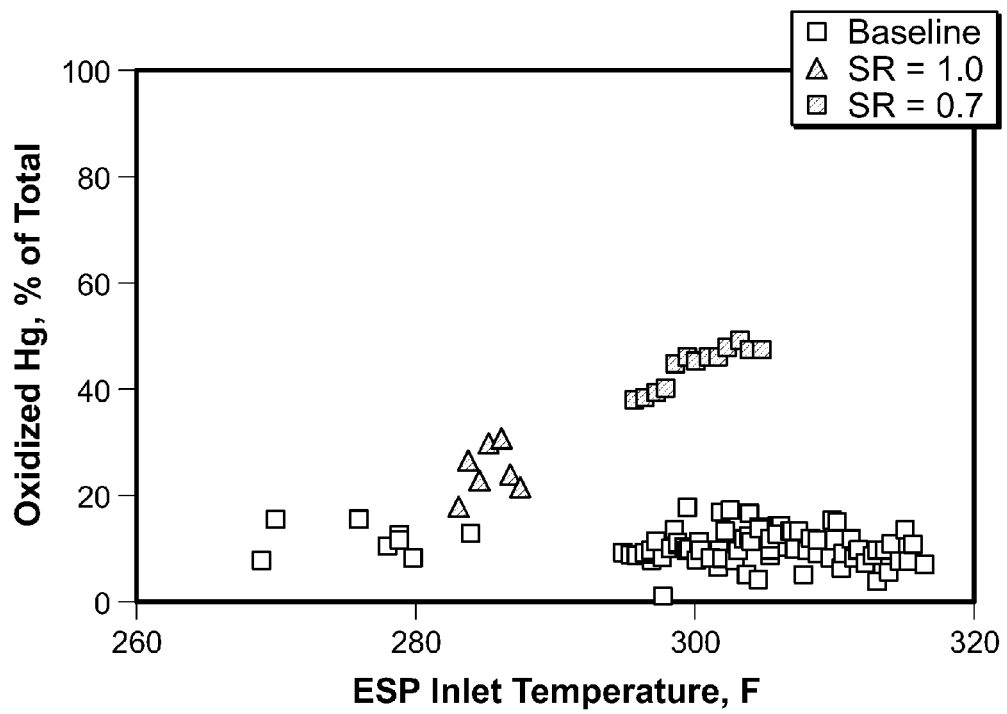
FIG. 3 is a graphical representation illustrating exemplary effects of air staging and temperature on mercury oxidation at ESP inlet and at a coal fineness of 68%<200 mesh.

FIGS. 2 and 3 illustrate exemplary effects of ESP temperature and staging on mercury oxidation in flue gas at the ESP inlet. More specifically, FIG. 2 shows a graphical representation of exemplary effects of air staging and temperature on mercury oxidation at the ESP inlet at a coal fineness of 76%<200 mesh, and FIG. 3 shows a graphical representation of exemplary effects of air staging and temperature on mercury oxidation at the ESP inlet at a coal fineness of 68%<200 mesh.

FIG. 2 illustrates that for a coal fineness of 76%<200 mesh, the SR value does not substantially affect the percentage of oxidized mercury in the flue gas 20. More specifically, at an average flue temperature, such as, for example, 299° F., the percentage of oxidized mercury is approximately 5%-18% for SR=1.16, SR=1.0, and SR=0.7. As such, the SR value does not significantly affect mercury oxidization at the ESP inlet.

FIG. 3 illustrates that for a coal fineness of 68%<200 mesh, the SR value does substantially affect the percentage of oxidized mercury in the flue gas 20. More specifically, at an average flue temperature, such as, for example, 285° F., the approximate percentage of oxidized mercury in the flue gas is less than 20% for the baseline SR of 1.16, and an approximate percentage of oxidized mercury in the flue gas is about 20%-30% for a SR of 1.0. Further, at a temperature, such as, for example, 300° F., the approximate percentage of oxidized mercury in the flue gas is less than 20% for the baseline SR of 1.16, and an approximate percentage of oxidized mercury in the flue gas is about 40%-50% for a SR of 0.7. As such, the SR value significantly affects the percentage of oxidized mercury at the ESP inlet, and, specifically, at more fuel rich stoichiometric ratios, a higher percentage of mercury oxidizes. FIG. 3 also illustrates that temperature may affect the oxidation of mercury in flue gas.

A comparison of the data illustrated in FIGS. 2 and 3 demonstrates that supplying a coal with a lower fineness, for example, but not limited to, a coal with a fineness of 68%<200 mesh, increases the percent of mercury oxidized at the ESP inlet. Because a higher percentage of mercury is oxidized from its unreactive elemental form, a higher percent of mercury may be removed from the flue gas by the ESP.

Figure 4:
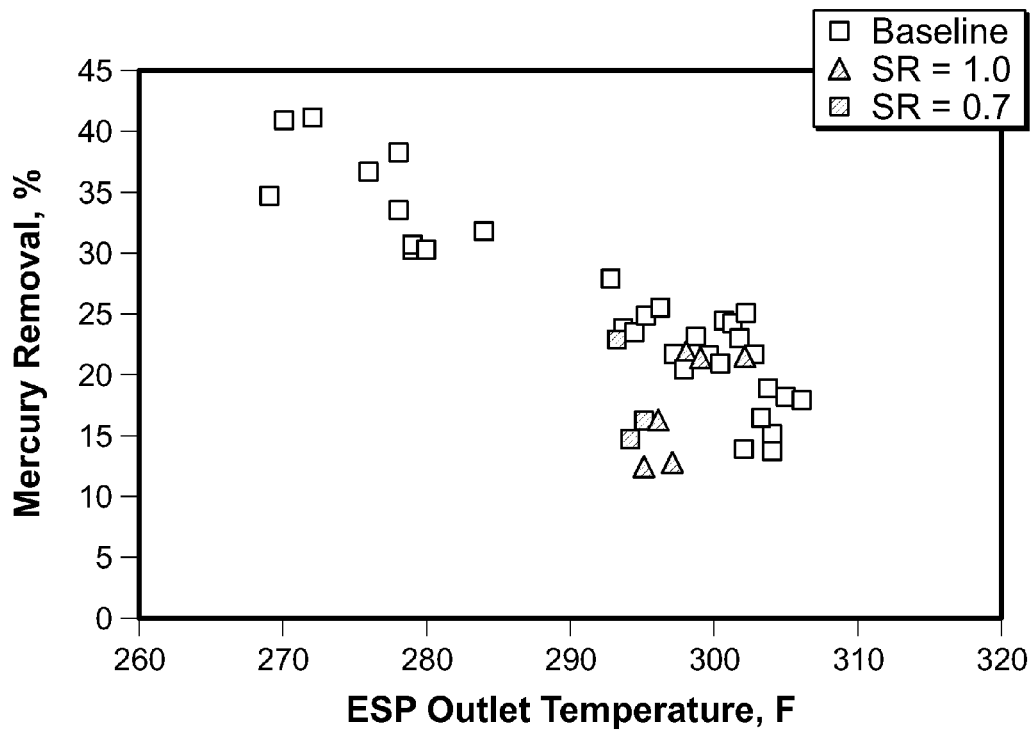
FIG. 4 is a graphical representation illustrating exemplary effects of air staging and temperature on mercury removal at an ESP outlet and at a coal fineness of 76%<200 mesh.
Figure 5:
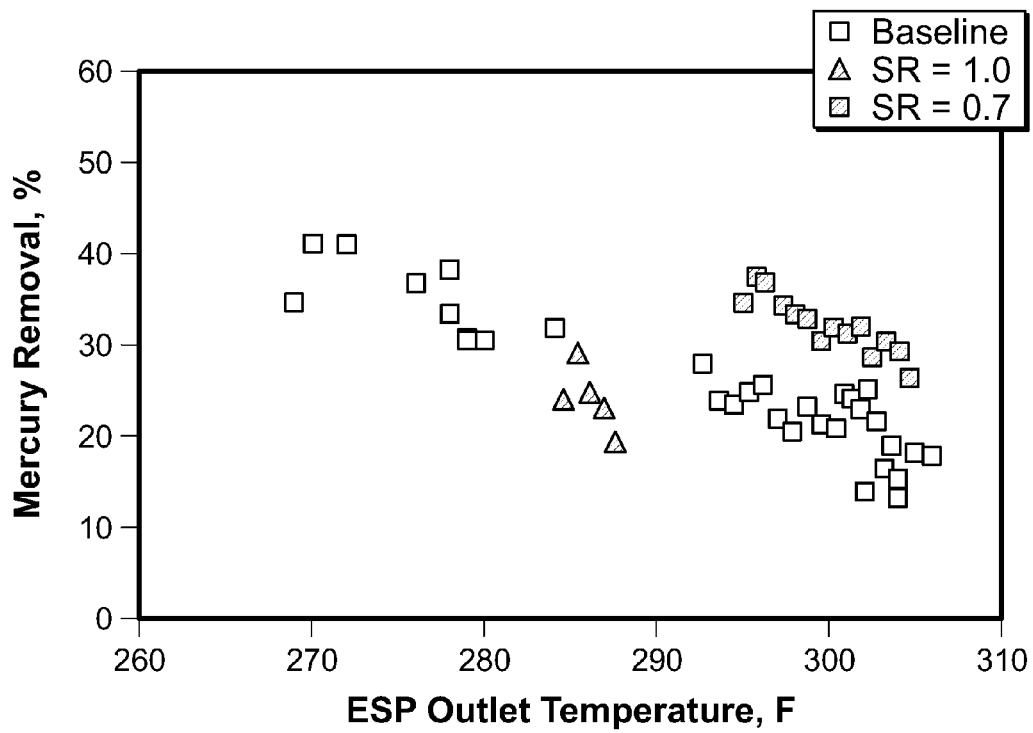
FIG. 5 is a graphical representation illustrating exemplary effects of air staging and temperature on mercury removal at the ESP outlet and at a coal fineness of 68%<200 mesh.

FIGS. 4 and 5 illustrate exemplary effects of ESP temperature and staging on mercury oxidation in flue gas at the ESP outlet. More specifically, FIG. 4 shows a graphical representation of exemplary effects of air staging and temperature on mercury oxidation at the ESP outlet at a coal fineness of 76%<200 mesh, and FIG. 5 shows a graphical representation of exemplary effects of air staging and temperature on mercury oxidation at the ESP outlet at a coal fineness of 68%<200 mesh.

FIG. 4 illustrates that for a coal fineness of 76%<200 mesh, the SR value does not substantially increase the percentage of mercury removed from the flue gas 20. More specifically, at an average flue temperature, such as, for example, 295° F., the percentage of mercury removed is approximately 12%-15% for SR=1.0, approximately 15%-18% for SR=0.7, and approximately 23%-27% for SR=1.16. As such, the SR value does not significantly increase mercury removal by the ESP. FIG. 4 also illustrates that, as temperature at the ESP outlet decreases, the percentage of mercury removed from the flue gas increases. As such, a higher ESP outlet temperature may adversely affect mercury removal.

FIG. 5 illustrates that for a coal fineness of 68%<200 mesh, the SR value does substantially affect the percentage of mercury removed from the flue gas 20. More specifically, at an average flue temperature, such as, for example, 286° F., the approximate percentage of mercury removed from the flue gas is about 30% for the baseline SR of 1.16, and an approximate percentage of mercury removed from the flue gas in about 19%-25% for a SR of 1.0. Further, at a temperature, such as, for example, 300° F., the approximate percentage of mercury removed from the flue gas is about 21% for the baseline SR of 1.16, and the approximate percentage of mercury removed from the flue gas is about 30%-33% for a SR of 0.7. As such, a decrease of the SR value to create a fuel rich environment increases the percentage of mercury removed by the ESP.

A comparison of the data illustrated in FIGS. 4 and 5 demonstrates that supplying coal with a lower fineness, for example, but not limited to, a coal with a fineness of 68%<200 mesh, increases the percentage of mercury removed by the ESP. More specifically, for an SR value of 0.7 and an outlet temperature of about 295° F., the percentage of removed mercury increases from about 15% to about 38%.

The above-described methods and apparatus facilitate reducing mercury from combustion exhaust gas by improving natural mercury capture on fly ash and improving sorbent utilization. Decreasing the percent fineness of the coal injected into the furnace facilitates increasing the size of the coal particles in the flue gas flow and facilitates increasing the amount of carbon contained within fly ash in the flue gas flow as compared to furnaces that combust coal with a higher percent fineness. Further, decreasing the percent fineness of the coal injected into the furnace facilitates improving the effects of combustion staging technologies, such as, for example, coal reburning and air staging, by increasing the fuel-to-air ratio within the combustion zone and convective pass. As such, pollutants, such as, but not limited to, mercury, have more carbon available to react with within flue gas flow. Moreover, in power plants using sorbent injection, the amount of sorbent injected is facilitated to be decreased when the percent fineness of the combusted coal is decreased because mercury has more carbon formed in-situ with which to react. Since carbon in ash may be an effective mercury sorbent formed in-situ, decreasing the percent fineness of the coal injected into the furnace facilitates improving mercury oxidation by providing a catalytic surface on which mercury is facilitated to be oxidized by chlorine containing species.

In addition, decreasing the percent fineness of the coal injected into the furnace is a cost-effective method for reducing mercury emissions because no physical change to the plant is needed when the percent fineness of the coal is decreased. Energy used to pulverized coal is also facilitated to be reduced because the coal does not require as much grinding as compared to coals with a higher percent fineness.

Exemplary embodiments of methods and apparatus for removing mercury from combustion exhaust gas are described above in detail. The methods and apparatus are not limited to the specific embodiments described herein, but rather, components of the methods and apparatus may be utilized independently and separately from other components described herein. For example, the decrease in the percentage fineness of coal may also be used in combination with other pollution control systems and methods, and is not limited to practice with only the coal-fired power plant as described herein. Rather, the present invention can be implemented and utilized in connection with many other pollutant emission reduction applications.

While the invention has been described in terms of various specific embodiments, those skilled in the art will recognize that the invention can be practiced with modification within the spirit and scope of the claims.

What is claimed is:

1. A method for reducing an amount of mercury in flue gas, said method comprising:
    injecting a quantity of coal having a fineness of less than 70%<200 mesh and greater than or equal to 50%<200 mesh;
    combusting the quantity of coal in a quantity of air such that at least carbon-containing fly ash and mercury are formed; and
    oxidizing mercury using at least the carbon-contain fly ash.

2. A method in accordance with claim 1 wherein injecting a quantity of coal further comprises injecting a quantity of coal wherein less than 70% and greater than or equal to 50% of coal particles have a diameter of less than 0.0029 inches.

3. A method in accordance with claim 1 wherein oxidizing mercury using at least the carbon-containing fly ash further comprises oxidizing mercury using a sorbent.

4. A method in accordance with claim 3 wherein oxidizing mercury using a sorbent further comprises injecting a sorbent downstream from a combustion zone.

5. A method in accordance with claim 1 wherein injecting a quantity of coal further comprises injecting a quantity of coal wherein less than 70% of coal particles pass through a wire mesh screen having 200 or fewer openings per square inch and greater than or equal to 1% of coal particles pass through a wire mesh screen having 50 or fewer openings per square inch.

6. A method in accordance with claim 1 wherein combusting the quantity of coal in a quantity of air further comprises combusting the quantity of coal in a fuel-rich environment.

7. A method in accordance with claim 1 further comprising removing oxidized mercury with a particulate control device.

8. A method for operating a coal-fired power plant, said method comprising:
    injecting coal into a combustion zone, wherein less than 70% and greater than or equal to 50% of coal particles have a diameter of less than 0.0029 inches;
    combusting coal in a quantity of air such that the coal combusts to form at least a combustion gas including at least mercury and carbon-containing fly ash; and
    oxidizing mercury using at least carbon-contain fly ash to facilitate removing mercury from the combustion gas.

9. A method in accordance with claim 8 wherein injecting coal further comprises injecting coal having a coal fineness of less than 70%<200 mesh and greater than or equal to 50%<200 mesh into the combustion zone.

10. A method in accordance with claim 8 wherein oxidizing mercury further comprises oxidizing mercury using a sorbent.

11. A method in accordance with claim 10 wherein oxidizing mercury using a sorbent further comprises injecting a sorbent downstream from the coal combustion zone.

12. A method in accordance with claim 8 wherein injecting coal further comprises injecting coal wherein less than 70% of coal particles pass through a wire mesh screen having 200 or fewer openings per square inch and greater than or equal to 1% of coal particles pass through a wire mesh screen having 50 or fewer openings per square inch.

13. A method in accordance with claim 8 wherein combusting coal in a quantity of air further comprises combusting coal in a quantity of air that forms a fuel-rich environment within at least a portion of the coal combustion zone.

14. A method in accordance with claim 8 further comprising removing oxidized mercury with a particulate control device.

15. A coal-fired power plant comprising:
a combustion zone;
coal having a fineness of less than 70%<200 mesh and greater than or equal to 50%<200 mesh;
combustion gas formed by combusting said coal within said combustion zone, said combustion gas comprising at least carbon-containing fly ash and mercury; and
a duct wherein said mercury reacts with at least said carbon-containing fly ash.

16. A coal-fired power plant in accordance with claim 15 further comprising a particulate control device configured to remove said mercury from said combustion gas.

17. A coal-fired power plant in accordance with claim 16 wherein said particulate control device is coupled to said duct.

18. A coal-fired power plant in accordance with claim 15 further comprising a sorbent injector coupled to said duct downstream from said combustion zone, said sorbent injector configured to inject a sorbent selected to react with at least said mercury within said duct.

19. A coal-fired power plant in accordance with claim 15 wherein said coal comprises coal particles sized such that less than 70% and greater than or equal to 50% of said coal particles have a diameter of less than 0.0029 inches.

20. A coal-fired power plant in accordance with claim 15 wherein said mercury reacts with at least one of said carbon-containing fly ash and a sorbent to oxidize.

* * * * *